United States Patent [19]

Hooberry

[11] 4,335,415

[45] Jun. 15, 1982

[54] ANTENNA LIGHTNING ARRESTOR

[76] Inventor: William D. Hooberry, 114 Enterprise St., Brunswick, Ga. 31520

[21] Appl. No.: 119,465

[22] Filed: Feb. 7, 1980

[51] Int. Cl.3 .......................... H02H 7/20; H02H 3/08

[52] U.S. Cl. .................................... 361/104; 361/124; 337/31; 337/34

[58] Field of Search ............... 361/104, 124, 119, 118, 361/117; 337/31, 26, 28, 29, 32, 34, 121, 186, 188, 190, 198, 199, 227, 228, 229, 235, 255, 256, 261, 263; 174/50, 50.52, 50.53, 50.54, 50.55, 50.56, 51

[56] References Cited

U.S. PATENT DOCUMENTS

| | | | |
|---|---|---|---|
| 1,111,574 | 9/1914 | Sebasco | 361/124 |
| 1,122,575 | 12/1914 | Cook et al. | 361/124 X |
| 2,058,594 | 10/1936 | Kelsay | 337/32 X |
| 2,600,407 | 6/1952 | Kelsay | 361/124 X |
| 2,654,857 | 10/1953 | Finkel | 361/119 X |
| 2,777,094 | 1/1957 | Weisberg | 361/119 |
| 2,859,423 | 11/1958 | Hyman | 361/104 X |
| 3,351,813 | 11/1967 | Trout | 361/104 X |
| 3,418,615 | 12/1968 | Canney | 337/198 X |
| 3,927,353 | 12/1975 | Reid et al. | 361/104 |

*Primary Examiner*—Patrick R. Salce

*Attorney, Agent, or Firm*—Harvey B. Jacobson

[57] ABSTRACT

A lightweight frame having a base of non-conducting material and end frame members consisting of aluminum mounts a pair of clip-type fuse supports. Each fuse support is attached to connectors which extend through the housing for connection to the lead in and ground lines of a radio, television, or like antenna. A plastic cover snaps in place over the base and ends to allow the user to view the condition of the fuses.

2 Claims, 2 Drawing Figures

ANTENNA LIGHTNING ARRESTOR

BACKGROUND OF THE INVENTION

1. Field of the Invention

This invention relates to surge protection devices for twin lead antenna lines for protecting the attached electrical equipment from harm during electrical storms or the like.

2. Discussion of Related Art

A plurality of devices for protecting lead lines from an antenna to a utilization device have been suggested. For instance, U.S. Pat. No. 1,122,575, issued Dec. 29, 1914, to Cook et al shows a device having an insulating base which carries mounting devices for two fuse elements. The mounting devices include springs for holding the fuse elements. The springs are held in place by screws which connect to the base of the device.

U.S. Pat. No. 2,654,857, issued Oct. 6, 1953, to Finkel, shows an antenna accessory having a body made from a hard electrically non-connective material. The body may be of elongated, rectangular configuration and has a groove formed longitudinally therein to provide a shallow wire way of proper width to receive a standard twin lead transmission line. A pair of current blocking means such as negative flow discharge tubes are connected from each lead to ground for providing an alternate path for lightning if it strikes the antenna.

U.S. Pat. No. 2,859,423, issued Nov. 4, 1958, to Hyman, shows an electrical connector for twin lead in lines comprising a housing made of a hard, electrically non-conducting material formed in an elongated, rectangular shaped parallelpiped with a recessed bottom surface. A novel raceway adaptable to operate with any of four differently shaped standard leading conductors is formed by means of recessed ledges, grooves, and a semi-circular undercut formed in the top surface of the housing.

SUMMARY OF THE INVENTION

One object of the present invention is to provide an antenna lightning arrestor which incorporates fuse protection for both the lead-in line and ground line.

A further object of the present invention is to provide an antenna lightning arrestor which is light in weight and formed from standardly available components so as to be able to be mass produced at a reasonable cost.

An even still further object of the present invention is to provide an antenna lightning arrestor which can be adapted to any size of antenna or coaxial cable wires.

In accordance with the foregoing objects, the present invention includes a non-connecting substantially planar base produced from fiberglass or similar resinous type material. The base is made in a generally rectangular shape and includes aluminum end plates which hold a clear plastic top cover. Attached to the base are a pair of clip-type fuse mounts. Each fuse mount is attached to a pair of leads for connection to a dual lead antenna wire. One embodiment of the invention includes coaxial cable connectors attached to each aluminum end plate, while a second embodiment includes screw connector leads extending from each of the fuse mounts.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
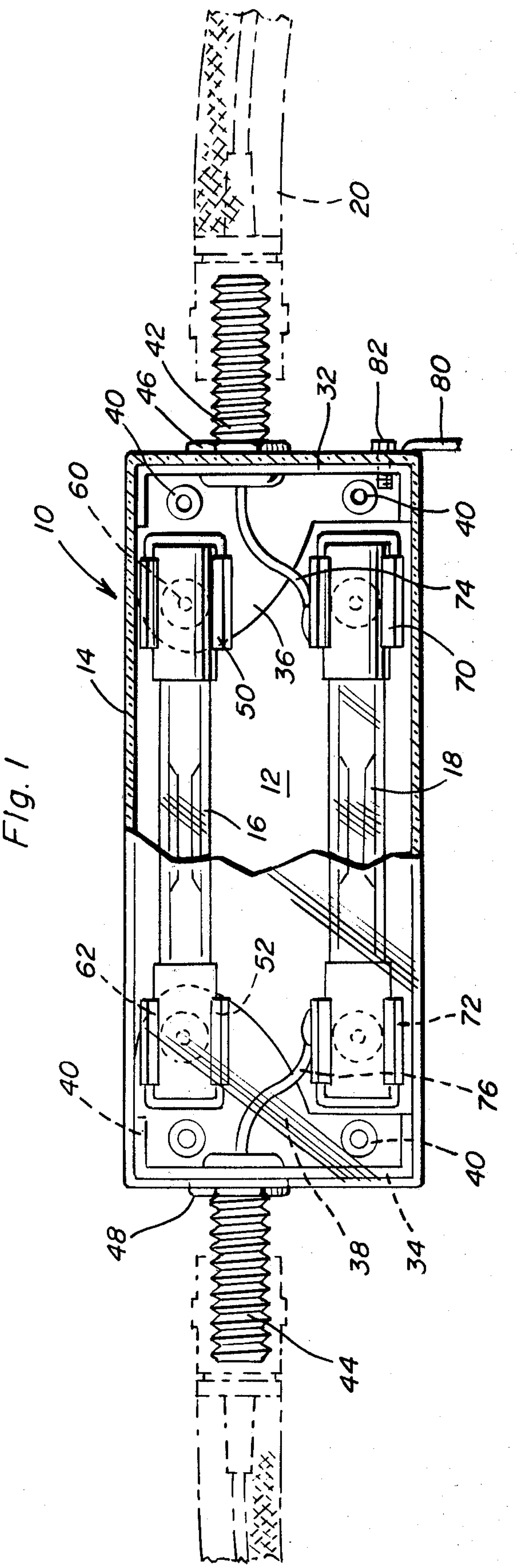
FIG. 1 is a top plan view of a first embodiment of the antenna lightning arrestor.
Figure 2:
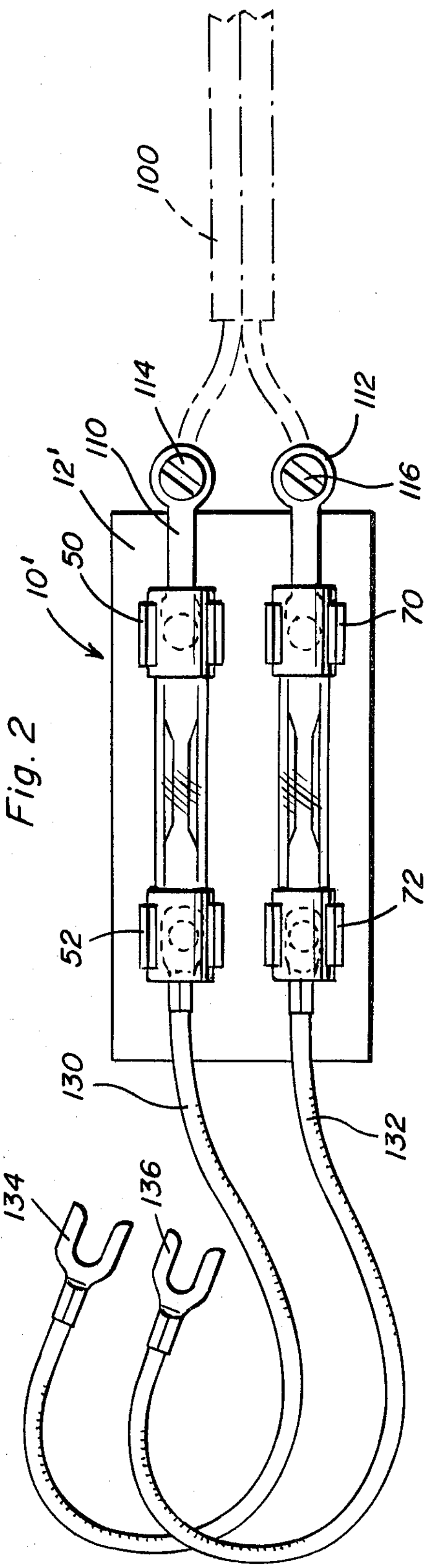
FIG. 2 is a top plan view of a second embodiment of the antenna lightning arrestor.

Now with reference to FIG. 1, an antenna lightning arrestor incorporating the principles and concepts of the present invention and generally referred to by the by the reference numeral 10 will be described in detail. Antenna lightning arrestor 10 includes a base 12 covered by a clear resinous cover 14 allowing the user to view the condition of fuses 16 and 18 disposed beneath the cover. Fuses 16 and 18, respectively, are connected to the inner and outer conductors of coaxial cable 20.

The base 12 is made from any hard, non-conductive material, such as fiberglass or other resinous sheet material. The base is generally planar in configuration and formed in a rectangular shape. At each end of base 12 there are connected aluminum walls 32 and 34. Walls 32 and 34 are respectively formed from aluminum sheets which include members 36 and 38 with the walls 32 and 34 being bent upwardly therefrom. The aluminum plates are attached to opposite ends of base 12 by use of rivets 40 which extend through the aluminum plates and the base. Walls 32, 34 mount coaxial cable connectors 42 and 44, respectively, which connectors are held against the wall by use of nuts 46 and 48. The external portion of connectors 42 and 44 engage the aluminum walls directly and thus contact the shielding of the coaxial cables connected thereto. Clip-type fuse retainers 50 and 52 are connected to members 36 and 38, respectively, by use of additional rivets 60 and 62. Accordingly, the fuse 16 extending between retainers 50 and 52 connects the shielding of the coaxial cables.

A second pair of clip connectors 70 and 72 are mounted directly to the base 12. Connectors 70 and 72 are attached to leads 74 and 76, respectively, which leads constitute the center conductor of coaxial connectors 42 and 44 and make engagement with the center conductor of the coaxial cables. Accordingly, fuse 18 serves as a connection between the center conductors of the coaxial cables attached to elements 42 and 44.

Finally, a grounding lug 80 is threadedly engaged with the wall 32 by use of screw-type connector 82 to serve as a grounding lug for service equipment checking the lines subsequent to a power surge.

Obviously, in use, the arrestor 10 is connected in a line between an antenna (not shown) and the utilization device which constitutes a television, radio, or the like. Upon an excessive power surge, caused by lightning or the like, one or both fuses 16 and 18 will blow. It will be readily apparent to the user that the fuse is blown since the fuse is visible through transparent cover 14. Cover 14 snaps onto the walls 32 and 34 in a conventional manner and thus can be easily removed for replacement of the blown fuse or fuses. The cover 14 completely encloses the device covering both the walls 32 and 34 and also enclosing the sides down to base 12.

In the event that standard dual cable antenna wire such as shown at 100 is used, an adaptation of the device shown at 10' can be used. Lightning arrestor 10' includes a base 12' made in a rectangular configuration and of similar material as that shown with reference to arrestor 10. Also, fuse retainers 50, 52 and 70, 72 are utilized, these being riveted directly to the base 12'. A pair of screw connector leads 110 and 112 are riveted along with connectors 50 and 70 to the base 12' and can thus be connected directly to the leads from dual lead cable 100 by use of screws 114 and 116. Connectors 52 and 72 are also riveted to leads 130 and 132 having fasteners 134 and 136 connected to the ends thereof. A plastic cover can also be fitted to the base 12' to protect the components in a manner similar to that done with reference to arrestor 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An antenna lightning arrestor including, in combination, a substantially planar non-conductive base having opposite ends and first and second side faces, a first conductive sheet overlying and mounted from one end of one side of said base, a second conductive sheet overlying and mounted from the other end of said one side of said base in insulative spaced relation relative to said first sheet, a first pair of opposite end fuse mounting clips conductively supported from and overlying the sides of said sheets remote from said base, a second pair of opposite end fuse mounting clips mounted from and overlying said one side of said base in non-conductive relation with said sheets, said first and second sheets including conductive outstanding first and second wall means supported therefrom and projecting outwardly of the sides of said sheets remote from said base, first and second connector means supported from said first and second wall means and comprising coaxial connectors each having external and internal portions non-conductively supported relative to each other, said external portions of said first and second conductor means being conductively supported from said first and second wall means and means electrically connecting the internal portions of said first and second connector means to said second pair of fuse mounting clips, and a transparent cover removably snap-fittingly engaged with said first and second wall means and enclosing said one side of said base, said fuse clips and said wall means therewithin.

2. The arrestor of claim 1 including a grounding lug conductively supported from one of said wall means and accessible from the exterior of said cover.

* * * * *